US006352569B1

(12) United States Patent
Beran et al.

(10) Patent No.: US 6,352,569 B1
(45) Date of Patent: Mar. 5, 2002

(54) LIQUID FERTILIZER BASED ON BIO-PROCESS ORGANIC RESIDUES

(75) Inventors: Zdenek Beran; Bohumil Mareš, both of Brno (CZ)

(73) Assignee: Lear, A.S., Brno. (CZ)

( * ) Notice: Subject to any disclaimer, the term of this patent is extended or adjusted under 35 U.S.C. 154(b) by 0 days.

(21) Appl. No.: 09/488,580

(22) Filed: Jan. 21, 2000

(30) Foreign Application Priority Data

Jan. 22, 1999 (CZ) .............................. 8919-99

(51) Int. Cl.⁷ ................................. C05C 9/00
(52) U.S. Cl. ................. 71/28; 71/29; 71/64.1
(58) Field of Search ............... 71/26, 28, 32, 71/33, 64.1, 29

(56) References Cited

U.S. PATENT DOCUMENTS

| 1,168,255 A | * | 1/1916 | Herzka ................... 71/26 |
| 4,604,125 A | | 8/1986 | Robertiello et al. .......... 71/26 |

FOREIGN PATENT DOCUMENTS

| CN | 1101905 A | | 4/1995 |
| CZ | 278 603 | | 3/1994 |
| CZ | 6906 | | 12/1997 |
| DE | 4324823 | * | 2/1994 |
| DE | 43 24 823 A1 | | 2/1995 |
| JP | 47029155 | * | 11/1972 |
| JP | 53044367 A | | 4/1978 |
| WO | WO 97/26228 | | 7/1997 |

* cited by examiner

*Primary Examiner*—Wayne Langel
(74) *Attorney, Agent, or Firm*—Blank Rome Comisky & McCauley LLP

(57) ABSTRACT

For applications as nutrient for field plants, vegetables, fruit trees and vines, and for decomposition of organic materials, like straw, composts, wood scraps and municipal wastes there is prepared a liquid fertilizer comprising from 10 up to 65% of mass of dry matter of organic residues and up to 50% of mass of dissolved urea and/or agrochemical matter containing phosphorus, the agrochemical matter being preferably in a form of suspended particles.

3 Claims, No Drawings

LIQUID FERTILIZER BASED ON BIO-PROCESS ORGANIC RESIDUES

TECHNICAL FIELD

The invention relates to a liquid fertiliser based on bio-process organic residues, especially molasses residues from the production of ferment spirit or citric and fruit water from processing of potatoes.

BACKGROUND OF THE INVENTION

Some residues from industrial technologies processing agriculture products can be recycled back to soil when utilised in a form of a fertiliser. Among them there are substrates from industrial bio-technologies, such as production of ferment spirit and citric acid, applying molasses for nourishment of productive micro-organisms. These residues have a liquid form and comprise a whole spectrum of mineral substances which are suitable for nutrition of plants. Liquid residues are also obtained by starch technologies. The said liquid residues are in a thick form, with a content of dry matter varying in the range from 35 up to 65% of mass. The content of combustible organic substances in the residue dry matter reaches up to 85% of mass. One ton of dry substances of the liquid residues comprise from 150 up to 250 kg of mineral nutrients, including from 40 up to 80 kg of nitrogen and from 70 to 170 kg of potassium. Further, there are comprised also up to 5% of mass of calcium, about 1% of mass of magnesium, and usually all micro-nutrients such as iron, zinc, manganese, copper, molybdenum and boron, their amounts depending upon the processing technology and the initial agriculture raw materials involved. Materials causing environmental pollution are present in these products only in trace quantities, the values of which are far from the limit figures being valid for hazardous substances in fertilisers. Liquid residues from the distillery production are known as molasses stillage and the residues from starch manufactures as fruit water. Already in the nineteenth century the molasses stillage was processed into residue coal, which was by means of leaching and evaporation crystallisation further processed into a blend of crystallic potassium salts, suitable as a field fertiliser. More sophisticated and updated technology of a production of a crystallic fertiliser from the molasses stillage through salting process by means of citric and phosphorus acids and subsequent vacuum crystallisation is the subject matter of the U.S. Pat. No. 4,604,125. The above methods present a drawback consisting in a complicated manufacturing procedure accompanied by a high energy consumption, making the final product rather expensive. Furthermore the salting-out technology step results in further organic wastes, which have to be disposed off.

At the present time the thick bio-process residues are used as a subsidiary fertiliser, improving soil fertility, incl. agrochemical properties. The fertiliser has a relatively high ratio of potassium to nitrogen and practically zero phosphorus content. An intensive application of the fertiliser, may result in an undesired increase of potassium content in the soil. The application of these residues in agriculture is also limited because of the form in which they are available. Mostly they exist as thick liquids of the non-Newton type, the properties of which depend upon temperature, storage conditions and application of mechanic forces. In a patent paper JP 53044367 there is described a method by which liquid molasses stillage, the residues being a product of an alcohol fermentation, is thickened by addition of agrochemicals containing nitrogen, phosphorus and potassium. The fertiliser obtained by this method has a form of a paste, the mechanical properties of which are similar to a gum and depend again upon temperature an storage period. This character of the fertiliser makes its current application in agriculture very difficult.

In the utility model CZ 6906 there is discussed a fertiliser consisting of dry solid granules, manufactured by a process comprising fluidised-bed drying and granulation of a thick paste, which is obtained by mixing inorganic agrochemicals and liquid residues. Such a rather complicated technology with high energy consumption results in a very expensive product.

Disadvantages of direct application of molasses stillage as a fertiliser are to a certain extent removed by the method according the patent paper CZ 278603. The composition of the molasses residues, with respect to basic nutrients, is corrected by adding solutions of ammonia salts of phosphorous acid or ammonia nitrate or ammonia sulphate. The achieved effect is significantly limited by a very low solubility of phosphates and saturation of the thick molasses residues. The whole procedure according this paper needs a lot of work and energy for the dissolving procedure.

It is an object of the invention to prepare a fertiliser allowing for more simple but more intensive and effective utilisation of residues from industrial processing of agriculture products.

DISCLOSURE AND OBJECT OF THE INVENTION

The foregoing problems are solved by a liquid fertiliser based on bio-process organic residues, preferably on molasses residues from the production of ferment spirit or citric acid and fruit water from processing of potatoes, the fertiliser in accordance with the present invention comprising from 10 up to 65% of mass of dry matter of organic residues and up to 50% of mass of dissolved urea and/or agrochemical matter containing phosphorus, provided the agrochemical matter is in a form of suspended particles.

According to one aspect of this invention the initial material, the liquid residues, containing considerable amount of potassium is enriched by nitrogen from the urea and by phosphorus from agrochemicals, preferably a phosphate of mineral origin. The obtained fertiliser has a form of a colloid system having properties of a liquid, regardless of high content of dry matter. This liquid is stable even by temperatures deep below 0° C. and can be stored for a long time period. It can be easily applied in a form of a fine spray, providing for an uniform fertilising of the soil area.

In accordance with further aspect of the invention the fertiliser manifests better agrochemical efficiency than original components. The comprised organic matters have positive influence upon the bio-sorption of nutrients from the agrochemicals, which represent substantial part of the fertiliser dry matter. Organic structures of the fertiliser nutrients favourably influence yields from and quality of agriculture products and improve soil quality, help to restore biological balance and regeneration of organic substances in soil. Tests of agrochemical efficiency of the liquid fertiliser have shown from thirteen up to twenty two percent increase in yield from tested products in comparison with results achieved with standard mineral fertilisers of the NPK type, ie. fertilisers containing nitrogen and/or phosphorus and/or potassium. The application of the said liquid fertiliser manifests decrease of content of hazardous elements both in the soil and the plants, increase of content of macro nutrients in soil as well as in dry matter of cultivated plants.

DESCRIPTION OF PREFERRED EMBODIMENTS

The invention is further described by way of examples of its practical application.

Example 1

By dissolving and homogenisation of urea within liquid organic residues there was prepared a fertiliser containing 36% of mass of dry matter of organic residues and 16% of mass of the urea. The content of basic nutrients in the fertiliser comprised 10% of mass of nitrogen and 5% of mass of potassium oxide. The fertiliser has a good fluidity, comparable to water solutions of mineral fertilisers. It is suitable for applications by spraying through fine nozzles as it has low surface tension and well wets the surface of plants. It is phase stable by temperatures down to −25° C. and during long storage period. It has low corrosive effects upon steel, non-ferrous metals and even concrete. It is not toxic and there have been observed no necrotic effects when sprayed on common agriculture plants. The fertiliser is preferably suitable for nitrogen fertilising in single or divided doses.

Example 2

By mixing and homogenisation of small particles of ammonia phosphates with liquid organic residues there was prepared a fertiliser containing 40% of mass of dry matter of organic residues and 17% of mass of phosphates. The content of basic nutrients in the fertiliser comprised 5% of mass of nitrogen, 9% of mass of phosphorus oxide and 5% of mass of potassium oxide. Due to its good fluidity the fertiliser is suitable for applications by impact spraying applying nozzles with apertures of a diameter over 2 mm. It is phase stable even by temperatures down to −10° C. During long storage period it may thicken up to a gel form showing tixotropic character and when mechanically mixed it regains former liquid properties. It has low corrosive effects upon steel, non-ferrous metals and even concrete. The fertiliser is preferably suitable for initial fertilising.

Example 3

By dissolving and homogenisation of urea within liquid organic residues with addition of small particles of ammonia phosphates there was prepared a fertiliser containing 35% of mass of dry matter of organic residues and 20% of mass of the urea and 10% of mass of phosphates. Content of nutrients in the fertiliser comprised 12% of mass of nitrogen and 5% of mass of phosphorus oxide and 4% of mass of potassium oxide. The fertiliser presenting good fluidity is suitable for applications by impact spraying through nozzles with apertures having a diameter over 2 mm. During long storage period it may thicken to a gel form showing thixotropic character and when mechanically mixed it regains former liquid properties. It has low corrosive effects upon steel, non-ferrous metals and even concrete. The fertiliser is preferably suitable for productive and auxiliary fertilising in divided doses and for decomposition of straw and similar residues left after a harvest period.

INDUSTRIAL APPLICATIONS

The present invention is designed for applications as nutrient for field plants, vegetables, fruit trees and vines, and for mass agriculture production as well as for small growers and garden keepers. The fertiliser is also usable for decomposition of organic materials, like straw, composts, wood scraps and municipal wastes.

What is claimed is:

1. A method of fertilising soil, plants, vegetables, fruit trees or vines using a liquid fertiliser composition, wherein said liquid fertiliser composition comprises bio-process liquid organic residues and urea and wherein said liquid fertiliser composition is formed by dissolving urea within liquid organic residues and is fluid and sprayable; and wherein said composition comprises from 10 up to 65% of mass of dry matter of organic residues and up to 50% of mass of dissolved urea; said bio-process liquid organic residues being selected from the group consisting of molasses residues from the production of ferment spirit, molasses residues from the production of citric acid, fruit water from the processing of potatoes and combinations thereof.

2. A method according to claim 1 wherein said liquid fertiliser composition further comprises agrochemical matter comprising phosphorous in a form of phosphates of mineral origin that are suspended particles.

3. A method according to claim 1 wherein said liquid fertiliser composition is sprayed.

* * * * *